(12) United States Patent
Kasperchik et al.

(10) Patent No.: US 11,998,977 B2
(45) Date of Patent: Jun. 4, 2024

(54) BUILD MATERIAL COMPOSITION WITH METAL POWDER AND FREEZE-DRIED HETEROPOLYMER

(71) Applicant: HEWLETT-PACKARD DEVELOPMENT COMPANY, L.P., Spring, TX (US)

(72) Inventors: Vladek Kasperchik, Corvallis, OR (US); James McKinnell, Corvallis, OR (US); Mohammed S. Shaarawi, Corvallis, OR (US); Michael G. Monroe, Corvallis, OR (US); Jason Hower, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/499,484

(22) PCT Filed: Mar. 15, 2018

(86) PCT No.: PCT/US2018/022684
§ 371 (c)(1),
(2) Date: Sep. 30, 2019

(87) PCT Pub. No.: WO2019/177614
PCT Pub. Date: Sep. 19, 2019

(65) Prior Publication Data
US 2020/0406351 A1 Dec. 31, 2020

(51) Int. Cl.
*B22F 1/10* (2022.01)
*B22F 1/05* (2022.01)
(Continued)

(52) U.S. Cl.
CPC .............. *B22F 1/10* (2022.01); *B22F 1/05* (2022.01); *B22F 1/102* (2022.01); *B22F 1/16* (2022.01);
(Continued)

(58) Field of Classification Search
CPC .. B22F 1/10; B22F 1/102; B22F 1/103; B22F 1/107; B22F 1/05; B22F 1/16;
(Continued)

(56) References Cited

U.S. PATENT DOCUMENTS 4,740,352 A 4/1988 Takahashi
5,782,954 A 7/1998 Luk
(Continued)

FOREIGN PATENT DOCUMENTS

CN 102862295 1/2013
CN 104997643 A 10/2015
(Continued)

OTHER PUBLICATIONS

Williams, et al. "Manufacturing cellular materials via three-dimensional printing of spray-dried metal oxide ceramic powder" (draft), GA Inst. of Technology,Jan. 2009, 10 pgs.
(Continued)

*Primary Examiner* — Alexandra M Moore
(74) *Attorney, Agent, or Firm* — Dierker & Kavanaugh, P.C.

(57) ABSTRACT

An example of a composition includes a host metal present in an amount ranging from about 95.00 weight percent to about 99.99 weight percent, based on a total weight of the composition. A flow additive is also present in an amount ranging from about 0.01 weight percent to about 5.00 weight percent, based on the total weight of the composition. The flow additive consists of an organic material that is pyrolyzable at a pyrolysis temperature that is less than a sintering
(Continued)

temperature of the host metal. The composition is spreadable, having a Hausner Ratio less than 1.25.

15 Claims, 6 Drawing Sheets

(51) Int. Cl.
| | |
|---|---|
| B22F 1/102 | (2022.01) |
| B22F 1/16 | (2022.01) |
| B22F 10/10 | (2021.01) |
| B22F 10/14 | (2021.01) |
| B22F 10/28 | (2021.01) |
| B22F 10/73 | (2021.01) |
| B29C 64/165 | (2017.01) |
| B33Y 10/00 | (2015.01) |
| B33Y 40/10 | (2020.01) |
| B33Y 70/10 | (2020.01) |
| B82Y 30/00 | (2011.01) |
| C08F 2/22 | (2006.01) |
| C08F 212/08 | (2006.01) |
| C08F 220/14 | (2006.01) |
| C08K 3/11 | (2018.01) |
| C09D 11/037 | (2014.01) |
| C09D 11/322 | (2014.01) |
| C09D 11/38 | (2014.01) |

(52) U.S. Cl.
CPC ............ B22F 10/10 (2021.01); B22F 10/14 (2021.01); B22F 10/73 (2021.01); B29C 64/165 (2017.08); B33Y 10/00 (2014.12); B33Y 40/10 (2020.01); B33Y 70/10 (2020.01); C08F 2/22 (2013.01); C08F 212/08 (2013.01); C08F 220/14 (2013.01); C08K 3/11 (2018.01); C09D 11/037 (2013.01); C09D 11/322 (2013.01); C09D 11/38 (2013.01); B22F 10/28 (2021.01); B22F 2304/10 (2013.01); B22F 2998/10 (2013.01); B82Y 30/00 (2013.01)

(58) Field of Classification Search
CPC .......... B22F 10/10; B22F 10/14; B22F 10/28; B22F 10/73; B22F 2201/01013; B22F 2201/04; B22F 2304/10; B22F 3/10; B22F 3/1021; B29C 64/165; B33Y 10/00; B33Y 40/10; B33Y 70/10; B82Y 30/00; C08F 2/22; C08F 212/08; C08F 220/14; C08K 3/11; C09D 11/037; C09D 11/322; C09D 11/38; C22C 1/05; C22C 1/1084
See application file for complete search history.

(56) References Cited

U.S. PATENT DOCUMENTS

| | | | |
|---|---|---|---|
| 7,073,349 | B2 | 7/2006 | Shekunov et al. |
| 7,258,720 | B2 | 8/2007 | Fuwa et al. |
| 8,760,719 | B2 | 6/2014 | Tyagi et al. |
| 8,992,659 | B2 | 3/2015 | Larsson et al. |
| 9,176,405 | B2 | 11/2015 | Nair et al. |
| 9,278,338 | B2 | 3/2016 | Coupland |
| 9,421,612 | B2 | 8/2016 | Fang et al. |
| 9,428,610 | B2 | 8/2016 | Diekmann et al. |
| 2002/0178866 | A1 | 12/2002 | Kawasaki |
| 2004/0009340 | A1 | 1/2004 | Zhu et al. |
| 2004/0182202 | A1 | 9/2004 | Geving et al. |
| 2005/0003189 | A1 | 1/2005 | Bredt et al. |
| 2006/0051513 | A1 | 3/2006 | Jackson et al. |
| 2006/0165910 | A1 | 7/2006 | Kodas et al. |
| 2006/0229197 | A1 | 10/2006 | Stark et al. |
| 2006/0251535 | A1 | 11/2006 | Pfeifer et al. |
| 2007/0178163 | A1 | 8/2007 | Kodas et al. |
| 2009/0136737 | A1 | 5/2009 | Ring et al. |
| 2013/0143043 | A1 | 6/2013 | Iwanaga et al. |
| 2014/0037338 | A1 | 2/2014 | Tyagi et al. |
| 2015/0035209 | A1 | 2/2015 | Shah et al. |
| 2015/0316868 | A1* | 11/2015 | Ganapathiappan .... G03G 9/131 430/114 |
| 2016/0002471 | A1 | 1/2016 | Peng et al. |
| 2016/0200891 | A1 | 7/2016 | Virgilio et al. |
| 2016/0333190 | A1 | 11/2016 | Brule et al. |
| 2017/0189960 | A1 | 7/2017 | Ibe |
| 2017/0326641 | A1* | 11/2017 | Lee ........................... B22F 3/16 |
| 2018/0044484 | A1 | 2/2018 | Kalyanaraman |
| 2018/0194662 | A1 | 7/2018 | Kim et al. |
| 2018/0369908 | A1* | 12/2018 | Muto ................. C04B 35/63444 |
| 2019/0016042 | A1 | 1/2019 | Chisholm |
| 2019/0062914 | A1 | 2/2019 | King et al. |

FOREIGN PATENT DOCUMENTS

| | | |
|---|---|---|
| EP | 1094909 | 12/2004 |
| EP | 1252952 A3 | 7/2005 |
| EP | 2221130 A1 | 8/2010 |
| EP | 2446985 A1 | 5/2012 |
| EP | 3187285 A1 | 7/2017 |
| EP | 3260258 A1 | 12/2017 |
| JP | 5905205 | 4/2016 |
| JP | 2017127998 A | 7/2017 |
| RU | 2000884 C1 | 10/1993 |
| RU | 2333076 C1 | 9/2008 |
| RU | 2489231 | 8/2013 |
| WO | 99/59753 A1 | 11/1999 |
| WO | WO2002011929 A1 | 2/2002 |
| WO | 2016/031279 A1 | 3/2016 |
| WO | 2016/065218 A1 | 4/2016 |
| WO | WO-2016068899 A1 * | 5/2016 ............ B22F 1/0062 |
| WO | WO2016119558 | 8/2016 |
| WO | WO-2016181378 A2 | 11/2016 |
| WO | WO-2017018985 | 2/2017 |
| WO | WO-2017040893 A1 | 3/2017 |
| WO | WO-2017040897 A1 | 3/2017 |
| WO | WO-2017059866 | 4/2017 |
| WO | WO-2017077220 A1 | 5/2017 |
| WO | WO-2017081160 A1 | 5/2017 |
| WO | WO-2017096748 | 6/2017 |
| WO | WO-2017099250 A1 * | 6/2017 ............ B22F 1/0003 |
| WO | WO-2017109497 | 6/2017 |
| WO | WO2017109703 A1 | 6/2017 |
| WO | WO-2017112687 A1 | 6/2017 |
| WO | WO-2017112689 A1 | 6/2017 |
| WO | WO-2017180314 | 10/2017 |
| WO | WO-2018017130 | 1/2018 |
| WO | WO-2018026962 | 2/2018 |
| WO | WO-2018031828 | 2/2018 |
| WO | WO-20180119409 A1 | 6/2018 |

OTHER PUBLICATIONS

Modasiya, M.K., et al. "Design and Characterization of Fast Disintegrating Tablets of Piroxicam", Int.J. PharmTech (2009), vol. 1, No. 2, pp. 354-357.

Bai et al."Effect of Bimodal Powder Mixture on Powder Packing Density & Sintered Density in Binder Jetting of Metals", May 2017,p. 758-771,p. 764, table 2, Hallottexo B I4HTepH.

Shikata, F., et al., "Real-time monitoring of granule properties during high shear wet granulation by near-infrared spectroscopy with chemometrics approach," 2017, Royal Society of Chemistry, vol. 7, pp. 38307-38317.

Yeap, S. P. "Permanent agglomerates in powdered nanoparticles: formation and future prospects." 2018. Powder technology. 323. p. 51-59. (Year: 2018).

Berretta, S., et al., Size, Shape and Flow of Powders for Use in Selective Laser Sintering, 2013, University of Exeter.

Anonymous: (A) Scanning electron microscopy (SEM) image of iron oxide . . . Download Scientific Diagram, online available at <https://www.researchgate.net/figure/A-Scanning-electron-microscopy-SEM-image-of-iron-oxide-nanoparticles-B-Field_fig2_337775798> Feb. 5, 2013, 13 pages.

(56) References Cited

OTHER PUBLICATIONS

Kumfer, B. M., et al., "Gas-phase flame synthesis and properties of magnetic iron oxide nanoparticles with reduced oxidation state," Journal of Aerosol Science, Sevier, Amsterdam, NL, vol. 41, No. 3, 2010, 15 pages.
Venables, H. et al. "Powder mixing", Drug Development and Industrial Pharmacy, vol. 27, No. 7, 2001, pp. 599-612.
Wikipedia, "Hausner ratio", XP93078417, Retrieved from the Internet Sep. 4, 2023: URL: https://en.wikipedia.org/wiki/Hausner_ratio, 1 page.

* cited by examiner

BUILD MATERIAL COMPOSITION WITH METAL POWDER AND FREEZE-DRIED HETEROPOLYMER

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional agents in some three-dimensional (3D) printing techniques. 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material to build the material together. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
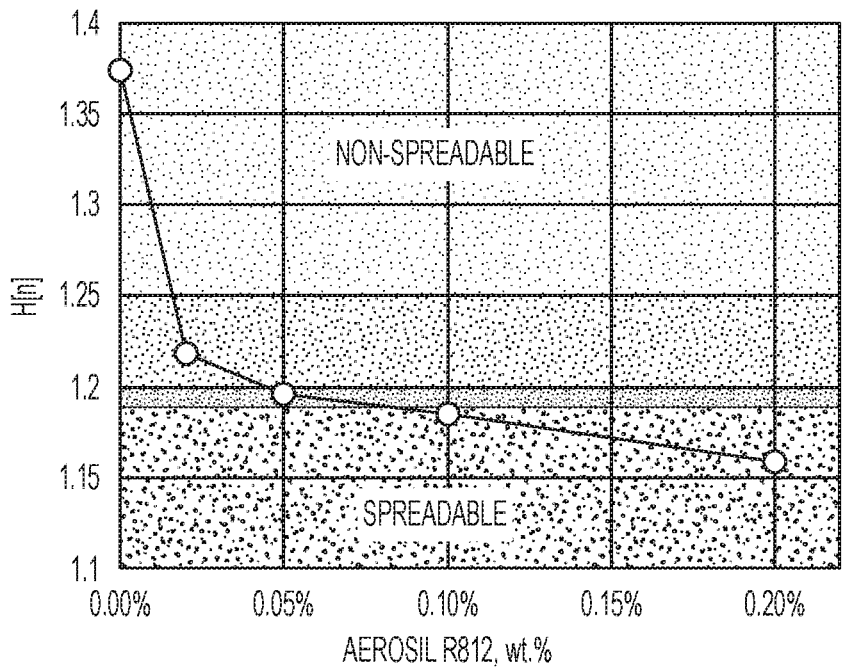
FIG. 1 depicts a graph of Hausner Ratio as a function of weight percentage for a mixture of a comparative fumed silica flow aid in 316L stainless steel powder.

Some examples of the composition of the present disclosure may be used in a process to create a final metal object. For example, the process to create the final metal object may be a 3D printing process. In some examples, the 3D printing process may include subsequent patterning of uniformly spread layers of the composition with liquid binder applied by means of an inkjet printhead. Each patterned layer of the composition forms an individual cross-section of the final metal object. Stacking of the binder-patterned layers produces an intermediate part which can be extracted from the powderbed after the patterning has been finished. The extracted intermediate part may be subjected to post-printing processing (e.g., heating via sintering), leading to consolidation of the particles of the composition into a mechanically stronger final metal object.

In other examples, the 3D printing process may include Selective Laser Melting (SLM). In these examples, uniformly spread layers of the composition are individually exposed to a laser beam of high energy density. The laser spot scans the spread metal powder surface, heats the metal particles, melts the metal particles and fuses the molten metal into continuous layers. During a SLM printing process, stacked fused layers (each layer representing a portion of the printed part) produce the final metal part (i.e., each subsequent laser-patterned layer is fused on top of the previous one). With SLM, the final metal part is produced without printing an intermediate part and without sintering the intermediate part. Therefore the sintering-related advantages of smaller particles size are not applicable to SLM; however, the flow additives disclosed herein enable non-classified, lower cost metal powders with wide particle size distribution to be used with SLM.

Examples of the composition disclosed herein may be referred to as a build material composition, which may be used to form a 3D printing composition. While some of the examples provided herein relate to 3D printing, it is to be understood that the composition may also be used in other methods and applications.

An example of the composition disclosed herein comprises a host metal present in an amount ranging from about 95.00 weight percent to about 99.99 weight percent, based on a total weight of the composition; a flow additive present in an amount ranging from about 0.01 weight percent to about 5.00 weight percent, based on the total weight of the composition, wherein the flow additive consists of an organic material that is pyrolyzable at a pyrolysis temperature that is less than a sintering temperature of the host metal; and wherein the composition is spreadable, having a Hausner Ratio less than 1.25. Organic materials typically pyrolyze in a pyrolysis temperature range of about 300° C. to about 500° C.; while most industrial metals have a sintering temperature range above about 600° C. to about 800° C. Many industrial metals sinter close to or well above 1000° C.

As such, in examples of the present disclosure, the composition is mainly the host metal. The host metal may be in powder form, i.e., particles. Sintering of the host metal particles usually happens below a melting temperature of the host metal. The sintering temperature of the host metal particles may be dependent, in part, on the size of the host metal particles. A host metal with a smaller average particle size will experience a faster sintering rate than a host metal having a larger average particle size. The rate of sintering of solid crystalline powders obeys Herring scaling law and is inversely proportional to the particle size by a power of between 2 and 4. Therefore, reducing a metal particle size may allow faster sintering at a lower sintering temperature. Both the speed of sintering and the sintering temperature may beneficially alter a structure of the sintered part. For example, a fast sintering rate at a lower temperature may prevent large grain growth. The prevention of large grain growth may improve ultimate tensile strength, yield strength, ductility and other mechanical properties of the final metal objects.

Thus, it may be desirable to use metal powders with the smallest particle size in 3D printing processes involving sintering. However, spreading of a powder into uniform thin layers of well-controlled thickness becomes increasingly difficult with decreased particle size. Without being held bound to any theory, it is believed that the reduced spreadability with decreasing particle size is due to inter-particle forces (i.e., van der Waals, electrostatic attraction, etc.) becoming significantly stronger than gravitational pull. Therefore, in general, powders become increasingly cohesive when a particle size of the powder is well below 100 μm. Smaller particles agglomerate together and the powders lose flowability. In the case of metals, even powders with spherical particles become non-spreadable into thin layers when the average particle size of the metal particles is within or below the range of about 12 μm to about 20 μm; especially when a fraction of particles present in the powder is within or smaller than the range of about 7 μm to about 10 μm. It is possible to remove the small particles from a metal powder by classification; however, classification is an additional process that adds to cost and removes the beneficial effects of small particles discussed above.

As mentioned above, examples of the composition disclosed herein include a flow additive in addition to the host metal. The flow additive disclosed herein is an organic material that is pyrolyzable at a pyrolysis temperature that is less than a sintering temperature of the host metal, and thus is unlike comparative flow additives that have been added to improve the flowability of difficult-to-spread cohesive metal powders with small particle sizes.

Examples of comparative flow additives include fumed oxide powders, which have been used to decrease the inter-particle cohesive forces in difficult-to-flow powders. It is believed that many, if not all, current commercially available comparative flow additives are based on different grades of fumed silica and, in some cases, fumed aluminum oxides. In some cases, precipitated colloidal silica powders have been used as comparative flow additives after surface modification.

These comparative flow additives are very low density powders made of loosely aggregated nano-particles. A typical particle size for the comparative flow additives ranges from about 1.5 to about 3 orders of magnitude smaller than the particle size of the cohesive powders to which the comparative flow additives are added. When added and mixed with cohesive host powders, these comparative flow additive nano-particles or their small aggregates stick to surfaces of the host particles. The host particle surfaces are coated with flow additive nano-spacers, thereby preventing agglomeration of the cohesive powder particles. Thus, formerly cohesive powders treated with an effective amount of the comparative flow additive (about 0.01 weight percent to 1.0 weight percent of the host powder) may be made flowable, with the potential of being spread in thin uniform layers. As used herein, better flowability of a composition means that the composition has better spreadability.

FIG. 1 depicts a graph of Hausner Ratio as a function of weight percentage for a mixture of a fumed silica flow aid in 316L stainless steel powder. The 316L stainless steel powder had an "as is" Hausner Ratio of about 1.37. Hausner Ratio (H[n]) is a powder flowability metric that can be measured by a tap density test. More specifically, the Hausner Ratio is a ratio of powder densities after and before compaction by tapping. A lower H[n] correlates to better flowability. Generally metal powders with spherical particle shape are suitable for 3D printing applications with a Hausner Ratio less than or equal to about 1.2. In some cases suitable flowability may be found with a Hausner Ratio up to about 1.25. The function depicted in FIG. 1 was determined from laboratory test results. The stainless steel powder was SAE 316L, grade −22 μm (80%) powder from "Sandvik", (average particle diameter is approximately 11 μm). The fumed silica flow aid was Aerosil R812, available from Evonik.

It has been found that the comparative flow additives based on fumed oxides of silicon and aluminum discussed above cannot be used to improve flowability of metal powders used in certain additive manufacturing processes (e.g., those involving sintering) without negatively affecting strength-related structural properties of the final metal objects produced during the sintering process. Silica and alumina are not reduced during sintering processes with or without a reducing atmosphere. As such, both silica and alumina flow additive nano-particles become part of the structure of the final metal object. More particularly, the silica and alumina flow additive nano-particles get incorporated into grain boundary space of the final metal object structure. The presence of silica and/or alumina inclusions in a metal object structure diminishes the mechanical strength and ductility of the metal object. Thus, although comparative flow additives may improve flowability of certain metal powders, the comparative flow additives deleteriously affect mechanical properties of 3D objects formed therefrom.

Figure 2:
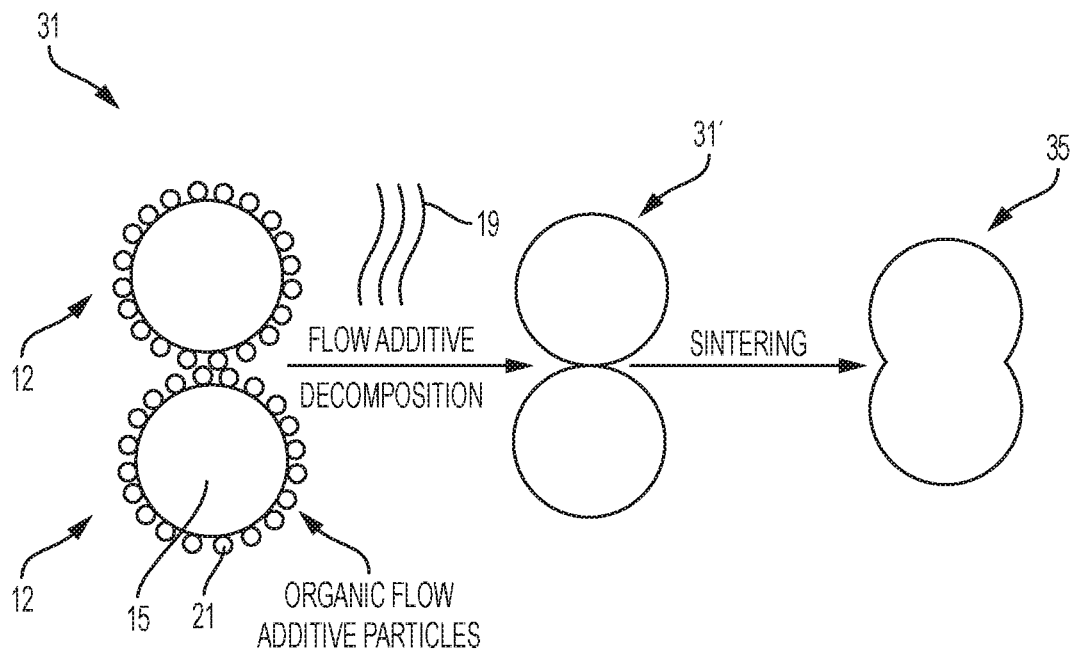
FIG. 2 is a schematic diagram depicting effects of processing on examples of the composition disclosed herein.

In the examples disclosed herein, the flow additives pyrolyze at a pyrolysis temperature that is less than a sintering temperature of the host metal, and thus, unlike the comparative flow additives, do not become part of the sintered, final metal object. FIG. 2 is a diagram depicting the composition (also referred to herein as a build material composition 12) of the present disclosure going through certain steps of an example of an additive manufacturing process. FIG. 2 begins with a portion of an intermediate part 31, which includes the build material composition 12 (host metal 15 and flow additive 21) patterned with a binder agent (not shown). During initial heating stages after patterning, the example flow aid 21 pyrolyzes, and thus decomposes, and is removed from the intermediate part 31. The vapor cloud 19 shown in FIG. 2 represents the flow additive 21 being removed from the build material composition 12 by pyrolysis. The remaining intermediate part 31' is then sintered to form the final 3D object or part 35.

Some examples of the composition/build material composition 12 disclosed herein include the host metal 15 and the flow additive 21. In some examples, the build material composition 12 includes particles of the host metal 15 and particles of the flow additive 21. In the present disclosure, the term "particles" means discrete solid pieces of components of the build material composition 12. As used herein, the term "particles" does not convey a limitation on the shape of the particles. As examples, particles may be spherical beads or irregularly shaped beads of lower aspect ratio.

In some examples, the particles of the host metal 15 may have an average host metal particle size less than 20 micrometers. In some examples, some host metal particles in a mixture of host metal particles may be as small as about 1 μm. The particles of the flow additive may have an average flow additive primary particle size ranging from about 1 to about 3 orders of magnitude smaller than an average host metal particle size. In some examples, the average flow additive primary particle size may range from about 5 nanometers to about 200 nanometers.

As disclosed herein, the flow additive 21 for the host metal 15 may be highly structured agglomerates of particulate materials with a relatively low density (e.g., 0.5% to 20% of a bulk density of the material forming the flow additive 21). For example, the highly structured agglomerates of particulate materials may have an agglomerate size ranging from a few μm to about 300 μm. The agglomerates are composed from primary particles having a primary particle size in nano-range, as mentioned hereinabove. In a container of the flow additive 21, the primary particles of the particulate may be encountered in low density, often fractal structures or agglomerates. When the flow additive agglomerates are mixed with a carrier powder (e.g., the host metal 15 disclosed herein), the flow additive agglomerates break down into either the individual primary particles or small fragments containing a few primary particles. The small fragments and individual primary particles stick to a surface of the host metal 15 particles and improve flowability of the host metal 15.

In examples, the host metal 15 is present (in the build material composition 12) in an amount ranging from about 95.00 weight percent to about 99.99 weight percent, based on a total weight of the build material composition 12. In other examples, the host metal 15 may be present in an amount ranging from about 98.00 weight percent to about 99.99 weight percent, based on a total weight of the build material composition 12. In still other examples, the host metal 15 may be present in an amount ranging from about 99.50 weight percent to about 99.99 weight percent, based on a total weight of the build material composition 12.

The flow additive 21 substantially makes up the remaining portion of the build material composition 12. "Substantially makes up the remaining portion" means that trace amounts of other materials may be present in the build material composition 12, whether intentionally or unintentionally. For example, dust or microbes may be found in the build material composition 12 in amounts that are too small to significantly alter the material properties of the build material composition 12. Therefore, the weight percent of the host metal 15, and the weight percent of the flow additive 21 add to yield about 100 weight percent of the build material composition 12.

In examples, the flow additive 21 is present in an amount ranging from about 0.01 weight percent to about 5.00 weight percent, based on the total weight of the build material composition 12. In other examples, the flow additive 21 may be present in an amount ranging from about 0.01 weight percent to about 2.00 weight percent, based on the total weight of the build material composition 12. In still other examples, the flow additive 21 may be present in an amount ranging from about 0.01 weight percent to about 0.50 weight percent, based on the total weight of the build material composition 12.

The host metal 15 may be a single phase metallic material composed of one element. In this example, the sintering temperature of the build material composition 12 may be below the melting point of the single element.

In another example, the host metal 15 is composed of two or more elements, which may be in the form of a single phase metallic alloy or a multiple phase metallic alloy. In these other examples, sintering generally occurs over a range of temperatures.

The host metal 15 may be composed of a single element or alloys. Some examples of the host metal 15 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti6Al4V, and Ti-6Al-4V ELI7. While several example alloys have been provided, it is to be understood that other alloys may be used.

The flow additive 21 is selected so that it i) does not function as an adhesive that would facilitate agglomeration of the host metal 15, and ii) so that it is pyrolyzable at a pyrolysis temperature that is less than a sintering temperature of the host metal.

A flow additive 21 that does not act as an adhesive may have a relatively high glass transition temperature (Tg) and may be relatively hydrophobic. In examples, the flow additive 21 may be a polymer having a glass transition temperature greater than about 5 degrees above the spread temperature (i.e., the temperature to which the build material composition 12 is exposed when it is spread during a 3D printing or other process). For example, if a spread temperature is 60° C., the Tg of the organic flow additive should be at least about 65° C. Softening of flow additive particles upon heating above Tg may turn some of the flow additive particles into adhesives; thus, attempting to spread the composition at a temperature above the Tg of the organic flow additive may compromise the flowability-improving properties of the flow additive. Moreover, the flow additive 21 may be hydrophobic. Without being held bound to any theory, it is believed that a hydrophilic flow additive may be plasticized by water (e.g., moisture from the surrounding environment) with a corresponding reduction in the glass transition temperature. Hydrophilic flow additives may induce stickiness into the build material composition 12. Highly hydrophilic, i.e., water-plasticizeable flow additive particles may turn into "sticky" adhesive particles upon atmospheric water vapor absorption. A sticky build material composition 12 will have a higher Hausner Ratio than a build material composition 12 that is not sticky. Therefore, a hydrophilic flow additive (such as water-dispersible polyurethane particles) in the build material composition 12 may cause the build material composition 12 to be less spreadable than the examples of the build material composition 12 disclosed herein, which include a hydrophobic flow additive. However, under special conditions where the flow additive 21 and the build material composition 12 are not exposed to a high humidity environment during storage or 3D printing, some amount of surface hydrophilicity in the flow additive 21 may be acceptable with little degradation in the performance properties of the flow additive 21.

In examples, the flow additive 21 is also selected so that it undergoes pyrolysis at a temperature below the sintering temperature of the host metal 15. It may be desirable for the flow additive decomposition to yield volatile decomposition products. In examples, the volatile decomposition products are at least about 40 percent of a pre-pyrolyzed weight of the flow additive 21. In other examples, the volatile decomposition products are at least about 70 percent of a pre-pyrolyzed weight of the flow additive 21. In still other examples, the volatile decomposition products are at least about 90 percent of a pre-pyrolyzed weight of the flow additive. In examples, the volatile decomposition products of the pyrolysis of the flow additive 21 may be a gaseous byproduct. Gaseous byproduct(s) may be removed using a flowing purge gas or some other suitable gas removal mechanism.

The flow additive decomposition may also yield, in some instances, a non-volatile carbon-rich product. As used herein, a carbon-rich product means a residue, char, or other decomposition product that is at least 50 percent carbon by weight. Presence of the carbon-rich decomposition product may slow the sintering process, but not significantly. In some instances then, it may be desirable to remove the non-volatile carbon-rich product. The non-volatile carbon-rich product can be converted into volatile hydrocarbons during sintering in a hydrogen-rich atmosphere. The volatile hydrocarbons may be gaseous and removed using a suitable gas removal mechanism.

In some examples, the carbon-rich product may be removed as follows: oxygen from the surrounding gas, or oxygen from a metal oxide that coats a surface of the host metal 15 particles, combines with the carbon to form CO or $CO_2$ gas. It should be noted that once the oxygen is depleted (either from the surrounding gas or the surface oxide) any carbon that has not been removed will remain in the part. The surface oxide reduction described above is active for some metals (Fe, Co, Cr, Ni) and not others (Ti).

In some examples, the flow additive 21 is to undergo pyrolysis to yield the volatile decomposition products and the non-volatile carbon-rich residue, the volatile decomposition products being at least about 70 percent of a pre-pyrolyzed weight of the flow additive.

In examples, the flow additive 21 may be a nano-powder produced by drying an aqueous dispersion of polymer nano-particles. For example, the flow additive 21 may be a nano-powder produced by freeze drying an aqueous dispersion of polymer nano-particles (latex). Freeze drying may prevent primary particles of the flow additive 21 from forming hard, difficult to break, agglomerates.

The polymer nano-particles may have several different morphologies. For example, the polymer nano-particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer nano-particles may include 2, 3, or 4 particles that are at least partially attached to one another.

The polymer nano-particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the flow additive 21 under typical ambient conditions. As used herein, typical ambient conditions include a temperature range from about 20° C. to about 25° C., an atmospheric pressure of about 100 kPa (kilopascals), and a relative humidity ranging from about 30% to about 90%.

Examples of monomers that may be used to form the hydrophobic component include C1 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher Tg hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high Tg hydrophilic monomers include acrylamide, methacrylamide, monohydroxylated monomers, monoethoxylated monomers, polyhydroxylated monomers, or polyethoxylated monomers.

The aqueous dispersion of polymer nano-particles (latexes) may be produced by emulsion polymerization or co-polymerization. In some examples, the aqueous dispersion of polymer nano-particles (latexes) may be produced by emulsion polymerization or co-polymerization of vinyl monomers, vinyl ester monomers, acrylate monomers, methacrylate monomers, styrene monomers, ethylene, maleate esters, fumarate esters, itaconate esters, or mixtures thereof.

In more specific examples, the aqueous dispersion of polymer nano-particles may be produced by emulsion polymerization or co-polymerization of monomers including: styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, and combinations thereof.

In examples, the Tg of such latexes as disclosed above may be controlled by selecting monomers or a combination of monomers which produce polymers with a high Tg upon polymerization. Examples of such monomers include styrene, methyl methacrylate, isobornyl acrylate, isobornyl methacrylate, trimethylcyclohexyl methacrylate and similar monomers. A small amount (i.e., less than about 3 weight percent) of water-soluble methacrylic acid may be introduced into the monomer mix in order to improve dispersibility of the latex in an aqueous environment.

In examples, the build material composition 12 is spreadable, having a Hausner Ratio less than 1.25. In other examples, the Hausner Ratio may be less than or equal to 1.20. The Hausner Ratio is determined at a spread temperature of the build material composition 12. As mentioned above and used herein, the spread temperature for the build material composition 12 is the temperature to which the build material composition 12 is exposed when it is to be spread as a layer. For example, the build material composition 12 may be spread at 25° C., 200° C., or at any other suitable spread temperature (including those temperatures between 25° C. and 200° C.). The relevant Hausner Ratio for the build material composition 12 of the present disclosure is the Hausner Ratio at the spread temperature of the composition/build material composition 12. As stated above, better flowability of the build material composition 12 means that the build material composition 12 has better spreadability.

Figure 3:
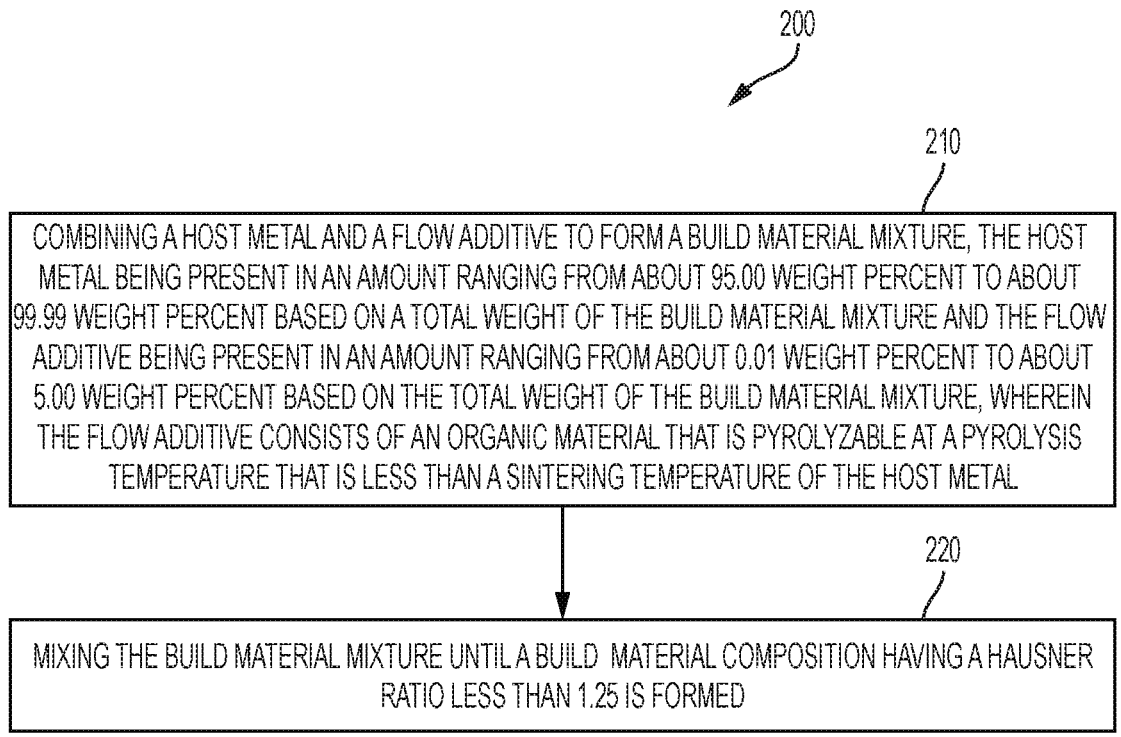
FIG. 3 is a flow diagram depicting an example of a method for making a build material composition according to the present disclosure.

Referring now to FIG. 3, a flow diagram 200 depicts an example of a method for making the build material composition 12 according to the present disclosure. As depicted at box 210, the method includes, "combining a host metal and a flow additive to form a build material mixture, the host metal being present in an amount ranging from about 95.00 weight percent to about 99.99 weight percent based on a total weight of the build material mixture and the flow additive being present in an amount ranging from about 0.01 weight percent to about 5.00 weight percent based on the total weight of the build material mixture, wherein the flow additive consists of an organic material that is pyrolyzable at a pyrolysis temperature that is less than a sintering temperature of the host metal". As shown at box 220, the method further includes "mixing the build material mixture until a build material composition having a Hausner Ratio less than 1.25 is formed."

In examples of the method 200, the host metal 15 may be present in any of the amounts described herein, e.g., ranging from about 98.00 weight percent to about 99.99 weight percent, or from about 99.50 weight percent to about 99.99 weight percent, based on a total weight of the build material composition 12. Also in the examples of the method 200, the flow additive 21 may be present in any of the amounts described herein, e.g., ranging from about 0.01 weight percent to about 2.00 weight percent, or from about 0.01 weight percent to about 0.50 weight percent, based on the total weight of the build material composition 12.

Any suitable conditions may be used to mix the host metal 15 with the flow additive 21. The Hausner Ratio may be tested periodically throughout the mixing process to determine when the desirable Hausner ratio has been obtained. In an example, simple mixing of the host metal 15 with the flow additive 21 in a rotating container for about 1 hour to about 2 hours may be sufficient mixing to obtain a uniform Hausner Ratio throughout the mixture. Very long mixing, (e.g., 2 days or more) may result in flowability degradation (i.e., an increase in the Hausner Ratio over the Hausner Ratio that is achieved by an amount of mixing that has a duration at a threshold of sufficiency to be effective).

Some processes that use the composition/build material composition 12 of the present disclosure to make metal objects may include spreading a thin layer of the build material composition 12 for subsequent processing. For example, in a 3D printing process, the build material composition 12 may be spread one layer upon another layer, with each layer patterned by a functional agent prior to the addition of the next layer. (See FIG. 1.) The functional agent may be a binder agent 14. Together, the build material composition 12 and the binder agent 14 to be selectively applied thereto may be referred to as a three-dimensional (3D) printing composition, which will be described more in reference to FIG. 4.

The build material composition 12 described herein may also be part of a 3D printing kit. In an example, the kit for three-dimensional (3D) printing, comprises: a build material composition including: a host metal present in an amount ranging from about 95.00 weight percent to about 99.99 weight percent, based on a total weight of the build material composition; and a flow additive present in an amount ranging from about 0.01 weight percent to about 5.00 weight percent, based on the total weight of the build material composition, wherein the flow additive consists of an organic material that is pyrolyzable at a pyrolysis temperature less than a sintering temperature of the host metal, wherein the build material composition is spreadable, having a Hausner Ratio less than 1.25; and a binder agent to be applied to at least a portion of a layer of the build material composition via an inkjet printhead to pattern a cross-section of an intermediate part. The kit may consist of the build material composition and the binder agent with no other components. The components of the kit may be maintained separately until used together in examples of the 3D printing method disclosed herein.

Figure 4:
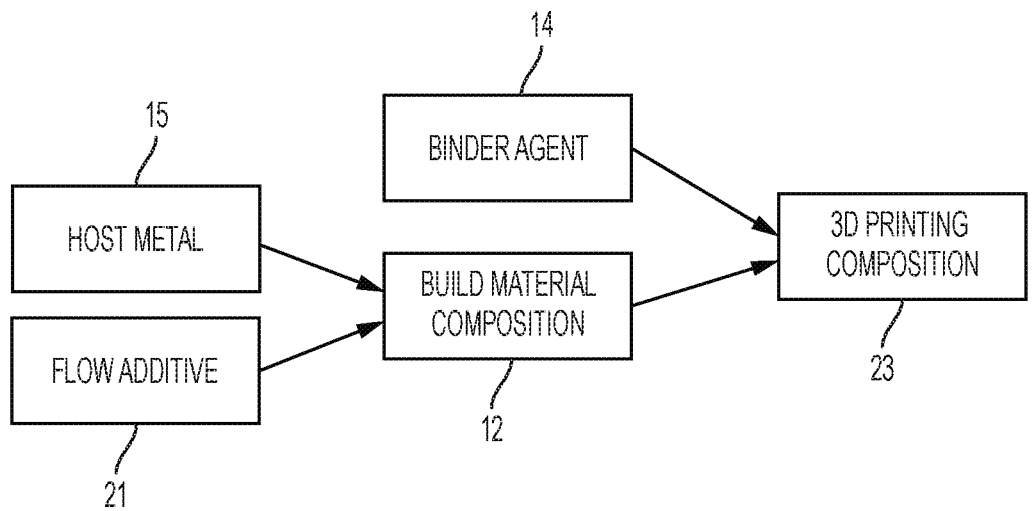
FIG. 4 is a block diagram that depicts components of a build material composition and a three-dimensional (3D) printing composition as disclosed herein.

FIG. 4 is a block diagram that shows components of the build material composition 12 and the 3D printing composition 23 as disclosed herein. In examples, the build material composition 12 and the binder agent 14 to be applied thereto yield the 3D printing composition 23. As such, examples of the 3D printing composition 23 disclosed herein include a build material composition 12, and the binder agent 14. More specifically, examples of the 3D printing composition 23 include the build material composition 12, which includes the host metal 15 present in an amount ranging from about 95.00 weight percent to about 99.99 weight percent, based on a total weight of the build material composition, and the flow additive 21 present in an amount ranging from about 0.01 weight percent to about 5.00 weight percent, based on the total weight of the build material composition 12, wherein the flow additive consists of an organic material that is pyrolyzable at a pyrolysis temperature less than a sintering temperature of the host metal 15, and wherein the build material composition 12 is spreadable, having a Hausner Ratio less than 1.25; and the binder agent 14 to be applied to at least a portion of a layer of the build material composition 12 via an inkjet printhead to pattern a cross-section of an intermediate part.

Any example of the host metal 15 and the flow additive 21 described herein may be used in any of the amounts described herein to form the build material composition 12 that is used to form the 3D printing composition 23.

The binder agent 14 may include a binder and a liquid vehicle.

Examples of suitable binders include latexes (i.e., an aqueous dispersion of polymer particles), polyvinyl alcohol, polyvinylpyrrolidone, and combinations thereof.

Examples of polyvinyl alcohol include low weight average molecular weight polyvinyl alcohols (e.g., from about 13,000 to about 50,000), such as SELVOL™ PVOH 17 from Sekisui. Examples of polyvinylpyrrolidones include low weight average molecular weight polyvinylpyrrolidones (e.g., from about 15,000 to about 19,000), such as LUVITEC™ K 17 from BASF Corp.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder agent 14, while the hydrophobic component is capable of coalescing upon exposure to heat in order to temporarily bind the host metal particles 15.

The polymer particles of the latex may have several different morphologies. The polymer particles may include two different copolymer compositions, which may be fully separated core-shell polymers, partially occluded mixtures, or intimately comingled as a polymer solution. In an example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. This may lead to good water dispersibility and jetting reliability. For another example, the polymer particle morphology may resemble a raspberry, in which a hydrophobic core is surrounded by several smaller hydrophilic particles that are attached to the core. For still another example, the polymer particles may include 2, 3, or 4 or more relatively large particles (i.e., lobes) that are at least partially attached to one another or that surround a smaller polymer core. The latex polymer particles may have a single phase morphology, may be partially occluded, may be multiple-lobed, or may include any combination of the morphologies disclosed herein.

The latex polymer particles may have a weight average molecular weight ranging from about 5,000 to about 500,000. As examples, the weight average molecular weight of the latex particles may range from about 10,000 to about 500,000, from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. The glass transition temperature of the latex particles may range from about −20° C. to about 130° C., or in a specific example, from about 60° C. to about 105° C. The particle size of the latex particles may range from about 10 nm to about 300 nm.

Examples of monomers that may be used to form the hydrophobic component include low $T_g$ monomers. Some examples include C4 to C8 alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In an example, the selected monomer(s) is/are polymerized to form a polymer, heteropolymer, or copolymer. In some examples, the monomer(s) are polymerized with a co-polymerizable surfactant. In some examples, the co-polymerizable surfactant can be a polyoxyethylene compound. In some examples, the co-polymerizable surfactant can be a HITENOL® compound e.g., polyoxyethylene alkylphenyl ether ammonium sulfate, sodium polyoxyethylene alkylether sulfuric ester, polyoxyethylene styrenated phenyl ether ammonium sulfate, or mixtures thereof.

The polymer particles may have a particle size that can be jetted via thermal inkjet printing or piezoelectric printing or continuous inkjet printing. In an example, the particle size of the polymer particles ranges from about 10 nm to about 300 nm.

Any suitable polymerization process may be used. In examples, the aqueous dispersion of polymer particles (latexes) may be produced by emulsion polymerization or co-polymerization of any of the previously listed monomers.

In an example, the polymer particles may be prepared by polymerizing high $T_g$ hydrophilic monomers to form the high $T_g$ hydrophilic component and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The low $T_g$ hydrophobic monomers and/or the high $T_g$ hydrophilic monomers used in any of these example methods may be any of the low $T_g$ hydrophobic monomers and/or the high $T_g$ hydrophilic monomers (respectively) listed above. In an example, the low $T_g$ hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

The resulting polymer particles may exhibit a core-shell structure, a mixed or intermingled polymeric structure, or some other morphology.

In some examples, the polymer particles have a MFFT or a glass transition temperature ($T_g$) that is greater (e.g., >) than ambient temperature. In other examples, the polymer particles have a MFFT or $T_g$ that is much greater (e.g., >>) than ambient temperature (i.e., at least 15° higher than ambient). As mentioned herein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The MFFT or the $T_g$ of the bulk material (e.g., the more hydrophobic portion) of the polymer particles may range from 25° C. to about 125° C. In an example, the MFFT or the $T_g$ of the bulk material (e.g., the more hydrophobic portion) of the polymer particles is about 40° C. or higher. The MFFT or the $T_g$ of the bulk material may be any temperature that enables the polymer particles to be inkjet printed without becoming too soft at the printer operating temperatures.

The polymer particles may have a MFFT or $T_g$ ranging from about 125° C. to about 200° C. In an example, the polymer particles may have a MFFT or $T_g$ of about 160° C.

In an example, the binder is present in the binder agent 14 in an amount ranging from about 1 wt % to about 40 wt % based on a total weight of the binder agent. In another example, the binder is present in the binder agent 14 in an amount ranging from about 2 wt % to about 30 wt % based on the total weight of binder agent 14.

In addition to the binder, the binder agent 14 may also include water, co-solvent(s), surfactant(s) and/or dispersing aid(s), antimicrobial agent(s), and/or anti-kogation agent(s).

The co-solvent may be an organic co-solvent present in an amount ranging from about 0.5 wt % to about 40 wt % (based on the total weight of the binder agent 14). It is to be understood that other amounts outside of this range may also be used depending, at least in part, on the jetting architecture used to dispense the binder agent 14. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, 2-pyrrolidones/pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the gas generating liquid functional agent may include 2-pyrrolidone, 2-methyl-1,3-propanediol, 1-(2-hydroxyethyl)-2-pyrrolidone, 1,2-butanediol, or combinations thereof.

The binder agent 14 may also include surfactant(s) and/or dispersing aid(s). Surfactant(s) and/or dispersing aid(s) may be used to improve the wetting properties and the jettability of the binder agent 14. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Air Products and Chemical Inc.). In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) may range from about 0.01 wt % to about 6 wt % based on the total weight of the binder agent 14.

The binder agent 14 may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the binder agent 14 may include a total amount of antimicrobial agents that ranges from about 0.1 wt % to about 1 wt %.

An anti-kogation agent may also be included in the binder agent 14. Kogation refers to the deposit of dried solids on a heating element of a thermal inkjet printhead. Anti-kogation agent(s) is/are included to assist in preventing the buildup of kogation, and thus may be included when the binder agent 14 is to be dispensed using a thermal inkjet printhead. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the binder agent 14 in an amount ranging from about 0.1 wt % to about 1 wt % of the total weight of the binder agent 14.

The balance of the binder agent 14 is water (e.g., deionized water). As such, the amount of water may vary depending upon the weight percent of the other binder agent 14 components.

Figure 5:
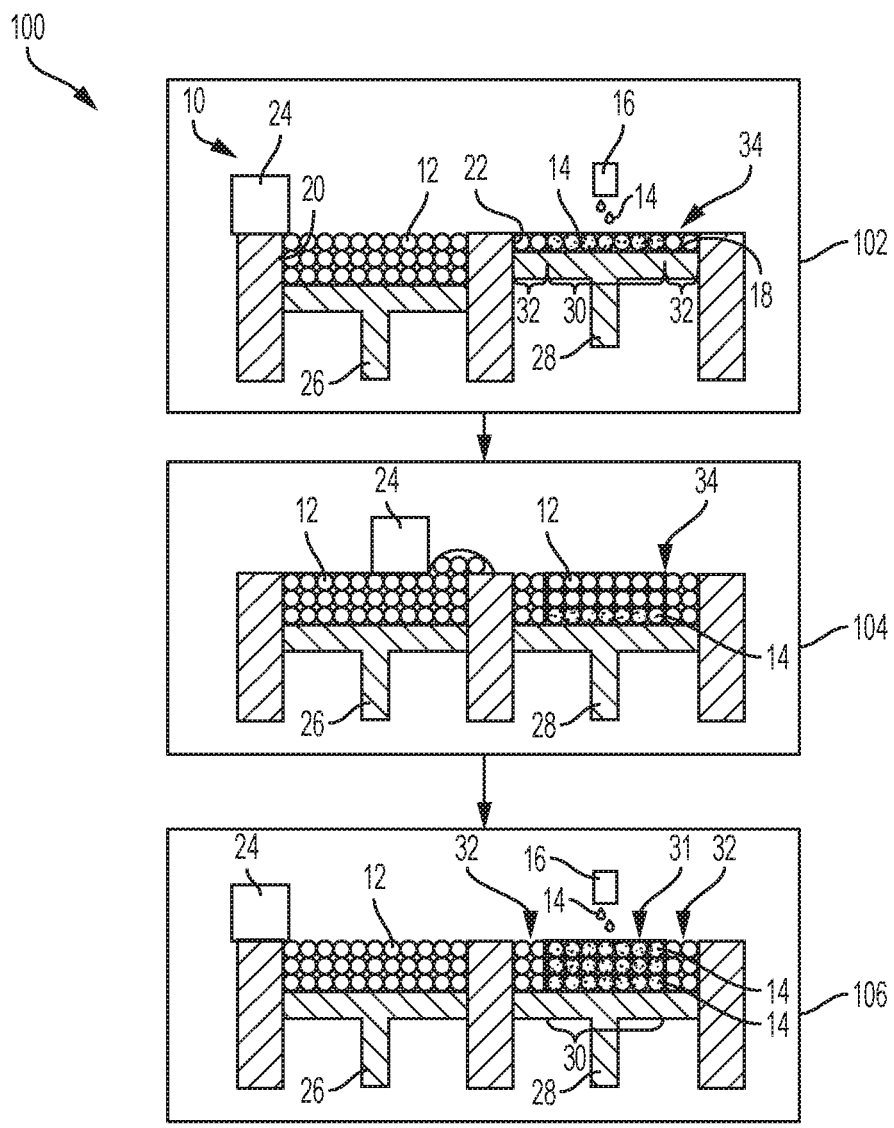
FIG. 5 depicts semi-schematic, partially cross-sectional views illustrating an example of a 3D printing method applying an example of the composition disclosed herein.

Examples of a printing method 100, which include the build material composition 12 and the binder agent 14 are shown in FIG. 5.

As depicted in FIG. 5 at reference numeral 102, a 3D printing system 10 may include an inkjet applicator 16, a supply bed 20 (including a supply of build material composition 12), a delivery piston 26, a spreader 24, a fabrication bed 22, and a fabrication piston 28. The delivery piston 26 and the fabrication piston 28 may be the same type of piston, but are programmed to move in opposite directions. In an example, when a layer of the 3D part 35 is to be formed, the delivery piston 26 may be programmed to push a predetermined amount of the build material composition 12 out of the opening in the supply bed 20 and the fabrication piston 28 may be programmed to move in the opposite direction of the delivery piston 26 in order to increase the depth of the fabrication bed 22. The delivery piston 26 will advance enough so that when the spreader 24 pushes the build material composition 12 into the fabrication bed 22 and onto the build surface 18 or the previously formed layer, the depth of the fabrication bed 22 is sufficient so that a layer 34 of the build material composition 12 and the binder agent 14 may be formed in the fabrication bed 22. The spreader 24 is capable of spreading the build material composition 12 into the fabrication bed 22 to form the build material layer 34, which is relatively uniform in thickness.

In an example, the thickness of the build material layer 34 ranges from about 10 μm to about 70 μm, although thinner or thicker layers may also be used. For example, the thickness of the layer may range from about 20 μm to about 1000 μm. Depending upon the desired thickness for the layer 34 and the particle size(s) within the build material composition 12, the layer 34 that is formed in a single build material application may be made up of a single row of the build material composition 12 or several rows of build material composition 12.

While the system 10 is depicted, it is to be understood that other printing systems 10 may also be used. For example, another support member, such as a build area platform, a platen, a glass plate, or another build surface may be used instead of the fabrication bed 22. The build material composition 12 may be delivered from another source, such as a hopper, an auger conveyer, or the like. It is to be understood that the spreader 24 may be a rigid or flexible blade, which is a more common spreader for metal/metal alloy build materials. However, the spreader may also be replaced by other tools, such as a roller, or a combination of a roller and a blade.

Figure 6:
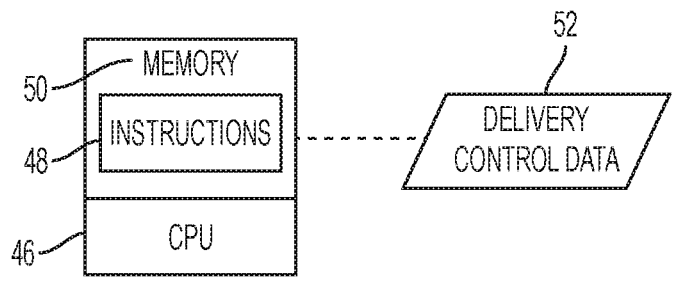
FIG. 6 is a block diagram illustrating a portion of a 3D printing system that can use an example of the composition disclosed herein.

Each of these physical elements of the 3D printing system 10 may be operatively connected to a central processing unit 46 (see FIG. 6) of the 3D printing system 10. The central processing unit 46 (e.g., running computer readable instructions 48 stored on a non-transitory, tangible computer readable storage medium) manipulates and transforms data represented as physical (electronic) quantities within the printer's registers and memories 50 in order to control the physical elements to create the 3D part 35. The data for the selective delivery of the binder agent 14, the build material composition 12, etc. may be derived from a 3D model of the 3D part 35 to be formed. For example, the instructions 48 may cause the controller to utilize an applicator (e.g., an inkjet applicator 16) to selectively dispense the binder agent 14, and to utilize a build material distributor (spreader 24) to dispense the build material composition 12. The central processing unit 46 controls the selective delivery (i.e. dispensing) of the binder agent 14 in accordance with delivery control data 52.

The binder agent 14 may be dispensed from any suitable applicator. As illustrated in FIG. 5 at reference number 102, the binder agent 14 may be dispensed from an inkjet applicator, such as a thermal inkjet printhead or a piezoelectric inkjet printhead. The printhead may be a drop-on-demand printhead or a continuous drop printhead. The inkjet applicator 16 may be selected to deliver drops of binder agent 14 at a resolution ranging from about 300 dots per inch (DPI) to about 1200 DPI. In other examples, the inkjet applicator 16 may be selected to be able to deliver drops of the binder agent 14 at a higher or lower resolution. The drop velocity may range from about 5 m/s to about 24 m/s and the firing frequency may range from about 1 kHz to about 100 kHz. The inkjet applicator 16 may include an array of nozzles through which it is able to selectively eject drops of fluid. In one example, each drop may be in the order of about 5 ng per drop, although it is contemplated that a higher (e.g., 100 ng) or lower (e.g., 1 ng) drop size may be used. In some examples, inkjet applicator 16 is able to deliver variable size drops of the binder agent 14.

The inkjet applicator(s) 16 may be attached to a moving XY stage or a translational carriage (neither of which is shown) that moves the inkjet applicator(s) 16 adjacent to the build surface 18 in order to deposit the binder agent 14 in desirable area(s) 30. In other examples, the applicator(s) 16 may be fixed while a support member (supporting the build surface 18) is configured to move relative thereto.

The inkjet applicator(s) 16 may be programmed to receive commands from the central processing unit 46 and to deposit the binder agent 14 according to a pattern of the layer 34 to be achieved. In an example, a computer model of the part 35 to be printed is generated using a computer aided design (CAD) program. The computer model of the 3D part 35 is sliced into N layers, which are then divided into voxels. The printing parameters for each voxel are computed based on the desired composition and physical properties of the part 35 to be printed. The printing parameters for each voxel may include the X, Y, and Z coordinates that define its location and the amount of the binder agent 14 (if any) that is to be received. The central processing unit 46 may then use this information to instruct the inkjet applicator(s) 16 as to how much (if any) of the binder agent 14 should be jetted into each voxel.

The inkjet applicator 16 selectively applies the binder agent 14 on those portions 30 of the layer 34 of the build material composition 12 that is to form the intermediate part, and ultimately the final 3D part 35. The binder agent 14 may not be applied on the entire layer 34, as shown at the portions 32.

After the binder agent 14 is selectively applied in a pattern on the desired portion(s) 30 of the layer 34 of build material composition 12, another layer of the build material composition 12 is applied, as shown at reference numeral 104 in FIG. 5, and patterned with the binder agent 14, as shown at reference numeral 106. The formation and patterning of additional layers may be repeated in order to form the intermediate part 31.

During and/or after formation of the intermediate part 31, liquid components of the binder agent 14 may be evaporated. At least substantially evaporation (with or without the application of heat) activates the binder, and the activated binder provides enough adhesive strength to hold the intermediate part 31 together with enough mechanical stability to survive removal from any non-patterned build material composition 12.

The intermediate part 31 may be extracted or separated from the non-patterned build material composition 12 (e.g., in portion(s) 32) by any suitable means. In an example, the intermediate part 31 may be extracted by lifting the intermediate part 31 from the non-patterned build material composition 12. Any suitable extraction tool may be used. In some examples, the intermediate part 31 may be cleaned to remove non-patterned build material composition 12 from its surface. In an example, the intermediate part 31 may be cleaned with a brush and/or an air jet, may be exposed to mechanical shaking, or may be exposed to other techniques that can remove the non-patterned build material composition 12.

The intermediate part 31 may then be placed in a heating mechanism (not shown). Examples of the heating mechanism include a conventional furnace or oven, a microwave, or devices capable of hybrid heating (i.e., conventional heating and microwave heating).

The heating mechanism may be used to perform a heating sequence, which involves exposing the intermediate part 31 to a pyrolysis temperature that decomposes the flow additive 21. The heating sequence may form the 3D object 35 (see FIG. 2). In some examples, heating involves exposure to a series of temperatures.

The series of temperatures may involve heating the intermediate structure 31 to a pyrolysis temperature, a de-binding temperature, and then to the sintering temperature. Briefly, the pyrolysis temperature removes the flow additive 21, and the de-binding temperature removes the binder, from the intermediate structure 31 to produce an at least substantially flow additive-free and binder-free intermediate structure 31', and the structure 31' may be sintered to form the final 3D object 35. Heating to pyrolyze, de-bind, and sinter may take place at several different temperatures, where the temperatures for pyrolyzing and de-binding are lower than the temperature(s) for sintering. In some instances, heating to de-bind and heating to pyrolyze may take place at the same temperature or within the same temperature range (e.g., from about 300° C. to about 500° C.).

Heating to pyrolyze is accomplished at a thermal decomposition temperature that is sufficient to thermally decompose the flow additive 21. As such, the temperature for pyrolysis depends upon the flow additive 21 used. In an example, the thermal decomposition temperature ranges from about 250° C. to about 600° C. In another example, the pyrolysis temperature ranges from about 300° C. to about 550° C. The flow additive 21 may have a clean thermal decomposition mechanism (e.g., leaves non-volatile residue in an amount <5 wt % of the initial binder, and in some instances non-volatile residue in an amount <<1 wt % of the initial binder). Since the amount of flow additive 21 in the build material composition 12 is low, any carbon residue that is formed and remains in the part is in a very small amount that does not deleteriously affect the part.

Heating to de-bind is accomplished at a thermal decomposition temperature that is sufficient to thermally decompose the binder. As such, the temperature for de-binding depends upon the binder in the agent 14. In an example, the thermal decomposition temperature ranges from about 250° C. to about 600° C. In another example, the thermal decomposition temperature ranges from about 300° C. to about 550° C. The binder may have a clean thermal decomposition mechanism (e.g., leaves non-volatile residue in an amount <5 wt % of the initial binder, and in some instances non-volatile residue in an amount <<1 wt % of the initial binder). The smaller residue percentage (e.g., close to 0%) is more desirable.

While not being bound to any theory, it is believed that the at least substantially flow additive and binder-free intermediate structure 31' may maintain its shape due, for example, to one or more of: i) the low amount of stress experience by the part 31' due to it not being physically handled, and/or ii) low level necking occurring between the host metal particles 15 at the pyrolysis temperature and at the thermal decomposition temperature of the binder. The at least substantially flow additive and binder-free intermediate structure 31' may maintain its shape although the binder is at least substantially removed and the host metal particles 15 are not yet sintered.

The temperature may be raised to sinter the substantially flow additive and binder-free intermediate structure 31', which can result in the formation of weak bonds that are strengthened throughout sintering. During sintering, the host metal particles 15 coalesce to form the 3D object 35, and so that a desired density of the 3D object 35 is achieved. The sintering temperature is a temperature that is sufficient to sinter the remaining host metal particles 15. The sintering temperature is highly depending upon the composition of the host metal particles 15. During sintering, the at least substantially flow additive and binder-free intermediate structure 31' may be heated to a temperature ranging from about 80% to about 99.9% of the melting point of the host metal particles 15. In another example, the at least substantially flow additive and binder-free intermediate structure 31' may be heated to a temperature ranging from about 90% to about 95% of the melting point of the host metal particles 15. In still another example, the at least substantially flow additive and binder-free intermediate structure 31' may be heated to a temperature ranging from about 60% to about 90% of the melting point of the host metal particles 15. In still another example, the sintering temperature may range from about 50° C. below the melting temperature of host metal particles 15 to about 200° C. below the melting temperature of the host metal particles 15. The sintering temperature may also depend upon the particle size and time for sintering (i.e., high temperature exposure time). As an example, the sintering temperature may range from about 500° C. to about 1800° C. In another example, the sintering temperature is at least 900° C. An example of a sintering temperature for bronze is about 850° C., and an example of a sintering temperature for stainless steel is between about 1300° C. and about 1400° C. While these temperatures are provided as sintering temperature examples, it is to be understood that the sintering temperature depends upon the host metal particles 15 that are utilized, and may be higher or lower than the provided examples. Heating at a suitable sintering temperature sinters and coalesces the host metal particles 15 to form a completed 3D object 35. As a result of final sintering, the density may go from 50% density to over 90%, and in some cases very close to 100% of the theoretical density.

The length of time at which the heat (for each of pyrolysis, de-binding, and sintering) is applied and the rate at which the structure 31, 31' is heated may be dependent, for example, on one or more of: characteristics of the heating mechanism, characteristics of the flow additive 21 and binder, characteristics of the host metal particles 15 (e.g., metal type, particle size, etc.), and/or the characteristics of the 3D object/part 46 (e.g., wall thickness).

Heating, respectively, at the pyrolysis and de-binding temperature may occur for a time period ranging from about 10 minutes to about 72 hours. When the structure 31 contains open porosity to vent out binder and/or flow aid 21 pyrolysis, and/or the amount of the binder and/or flow aid 21 is low, and/or the wall thickness of the structure 31 is relatively thin, the time period for de-binding and pyrolysis may be 3 hours (180 minutes) or less. Longer times may be used if the structure 31 has less open porosity, if the structure 31 has thicker walls, and/or if the structure 31 has a higher concentration of binder. In an example, the pyrolysis and de-binding time period is about 60 minutes. In another example, the de-binding time period is about 180 minutes. The intermediate part 31 may be heated to the pyrolysis and/or de-binding temperatures at a heating rate ranging from about 0.5° C./minute to about 20° C./minute. The heating rate (i.e. temperature rise rate) may depend, in part, on one or more of: the amount of the flow additive and/or binder and/or the porosity of the intermediate part 31.

The at least substantially flow additive and binder-free intermediate structure 31' may be heated at the sintering temperature for a time period ranging from about 20 minutes to about 15 hours. In an example, the sintering time period is 60 minutes. In another example, the sintering time period is 90 minutes. In still another example, the sintering time period is less than or equal to 3 hours. The at least substantially flow additive and binder-free intermediate structure 31' may be heated to the sintering temperature at a heating rate ranging from about 1° C./minute to about 20° C./minute.

While FIG. 5 illustrates one example 3D printing process, it is to be understood that the build material composition 12 may be used in other additive manufacturing processes. An example of another additive manufacturing process is direct metal laser sintering (DMLS). During DMLS, an energy beam is aimed at a selected region (in some instances less than the entire layer) of a layer of the build material composition 12. The energy beam may first applied to cause the flow additive 21 in the build material composition 21 to decompose, and then the intensity may be increased to raise the temperature so that the remaining host metal particles 15, which are exposed to the energy beam, sinter to form the layer of the 3D part. The application of additional build material composition 12 layers and the selective energy beam exposure may be repeated to build up the 3D part layer by layer. In examples that use DMLS, a binder agent 14 may be omitted from the process.

To further illustrate the present disclosure, an example is given herein. It is to be understood that this example is provided for illustrative purposes and is not to be construed as limiting the scope of the present disclosure.

Example

Figure 7:
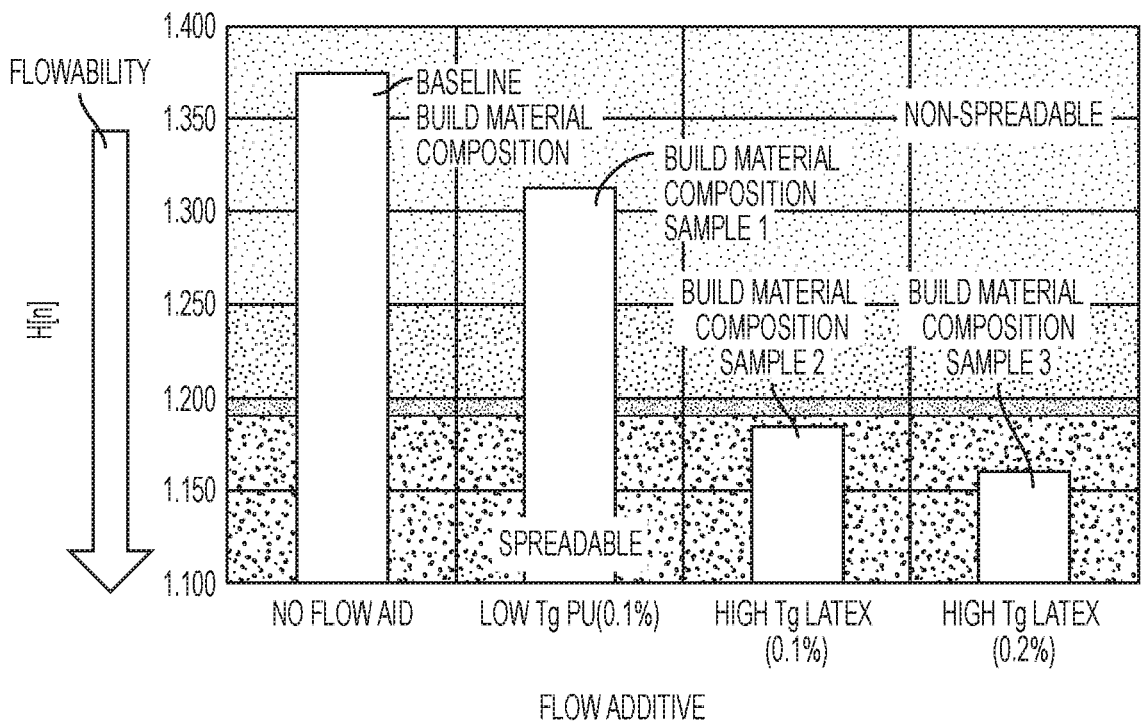
FIG. 7 is a column graph depicting Hausner Ratio test results of examples of build material compositions according to the present disclosure.

Build material compositions were tested. The host metal was stainless steel, 316L, grade −22 μm (80%) powder from "Sandvik", (average particle Diameter was about 11 μm). As shown in FIG. 7, the baseline build material composition (the host metal powder without any flow additive) demonstrated poor flowability, with a Hausner ratio of about 1.37. The result for the baseline build material composition is labeled "No Flow Aid" in FIG. 7. When the host metal powder was blended with organic flow additives, the flowability improved as detailed below. Organic flow additive candidates were prepared as follows:

Organic Flow Additive Candidate A was prepared by freeze-drying a low Tg polyurethane (PU) dispersion having a Tg of about 30° C. and an average primary particle size of about 15 nm (measured in dispersion). It is to be understood that, after freeze drying, individual nano-particles may agglomerate into low density μm to multi-μm size agglomerates, with a typical agglomerate size ranging from about 1 μm to about 500 μm. However, these agglomerates quickly break apart into the primary particles during mixing of the flow aid with the host metal.

Organic Flow Additive Candidate B was prepared by freeze drying a high Tg styrene-acrylic latex. The styrene-acrylic latex was formed by the copolymerization of a methyl methacrylate and styrene monomer mixture having a small amount of methacrylic acid. This high Tg styrene-acrylic latex had a Tg of about 90° C.-95° C. and an average primary particle size of about 60 nm. As stated above, after freeze drying, individual nano-particles may agglomerate into low density μm to multi-μm size agglomerates. However, these agglomerates quickly break apart into the primary particles during mixing of the flow aid with the host metal.

Build material composition sample 1 had Organic Flow Additive Candidate A (the PU low Tg flow additive) blended at 0.1 weight percent with the 316L host metal powder. Build material composition sample 2 had Organic Flow Additive Candidate B (the styrene/acrylic high Tg flow additive) blended at 0.1 weight percent with the 316L host metal powder. Build material composition sample 3 had Organic Flow Additive Candidate B (the styrene/acrylic high Tg flow additive) blended at 0.2 weight percent with the 316L host metal powder.

A Granupack density tester tap (available from Granutools, www.granutools.com) was used to evaluate the powder flowability of the build material compositions. As shown in FIG. 7, the build material composition sample 1 had a Hausner Ratio of about 1.31. The build material composition sample 1 had a lower Hausner Ratio than the baseline build material composition, but build material composition sample 1 was still considered non-spreadable. As shown in FIG. 7, build material composition sample 2 had a Hausner Ratio of about 1.18. Build material composition sample 2 had a lower Hausner Ratio than build material composition sample 1; and build material composition sample 2 was considered spreadable. As shown in FIG. 7, build material composition sample 3 had a Hausner Ratio of about 1.16. Build material composition sample 3 had a lower Hausner Ratio than build material composition samples 1 and 2; and build material composition sample 3 was considered spreadable.

As shown in FIG. 7, the 0.1 weight percent addition of flow additive produced by freeze drying of the lower Tg PU dispersion lowered the Hausner Ratio of build material sample 1 compared to the host metal powder without any flow additive; but the flowability improvement was not enough to make the powder reliably spreadable, for example for a 3D printing process. In sharp contrast, the addition of the styrene-acrylic high Tg latex at 0.1 weight percent and 0.2 weight percent lowered the Hausner Ratio below 1.2, and made it feasible to spread build material composition sample 2 and build material composition sample 3 in uniform thin layers for reliably successful usage in a 3D printing process.

Figure 8:
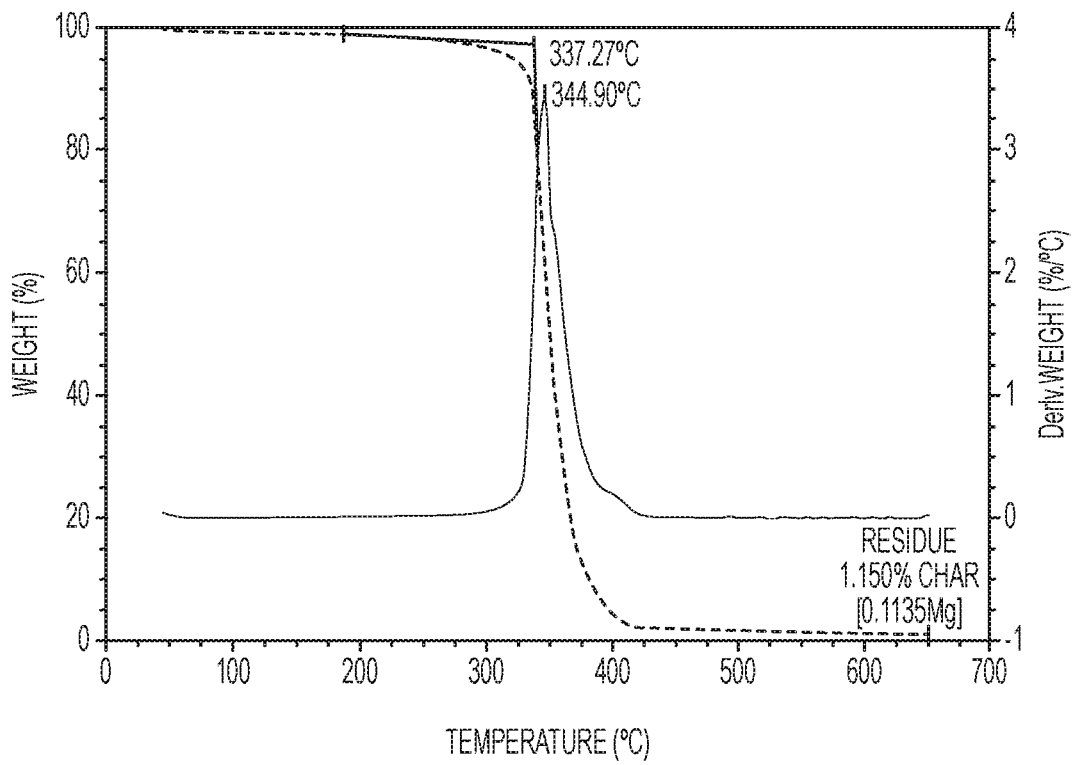
FIG. 8 is a Thermogravimetric Analysis (TGA) trace depicting test results of pyrolysis of a test sample of a build material composition as disclosed herein.

FIG. 8 is a Thermogravimetric Analysis (TGA) trace depicting pyrolysis of a 9.872 mg sample of Organic Flow Additive Candidate B (the styrene/acrylic high Tg flow additive). As depicted in FIG. 8, most of the mass of Organic Flow Additive Candidate B is removed below 400° C. The amount of non-volatile carbon-rich residue produced by pyrolysis of the Organic Flow Additive Candidate B is about 1.15 weight percent of the starting material.

A 3D printing process, involving layer patterning with a binder agent and heating, was used to make blanks which were machined into tensile test specimens according to DIN 50125-B 4×20. The test specimens were tested according to ASTM E8/E8M-16a, Standard Test Methods for Tension Testing of Metallic Materials, ASTM International, West Conshohocken, Pa., 2016, www.astm.org.

The baseline build material composition described above was not used to make the SS316L control blanks because the host metal powder (alone) had insufficient spreadability for the 3D printing process. The SS316L powder used to make the SS316L control blanks was first "classified" to improve the flowability. As used herein, "classified" means fine particles were removed from the SS316L powder. The SS316L control blanks were machined to make SS316L control specimens for the tensile testing. Test results from the SS316L control specimens are labeled "SS316L" in FIG. 9, FIG. 10, and FIG. 11.

Build material composition sample 2 was used in the same 3D printing process (with a binder agent and heating) to make blanks which were subsequently machined to make the SS316L+FA specimens for the tensile testing. The 3D printing process included a pyrolysis step as disclosed herein to remove the styrene/acrylic high Tg flow additive leaving a small amount of carbon-rich residue in the SS316L+FA blank before sintering. Test results from the SS316L+FA specimens are labeled "SS316L+FA" in FIG. 9, FIG. 10, and FIG. 11.

Figure 9:
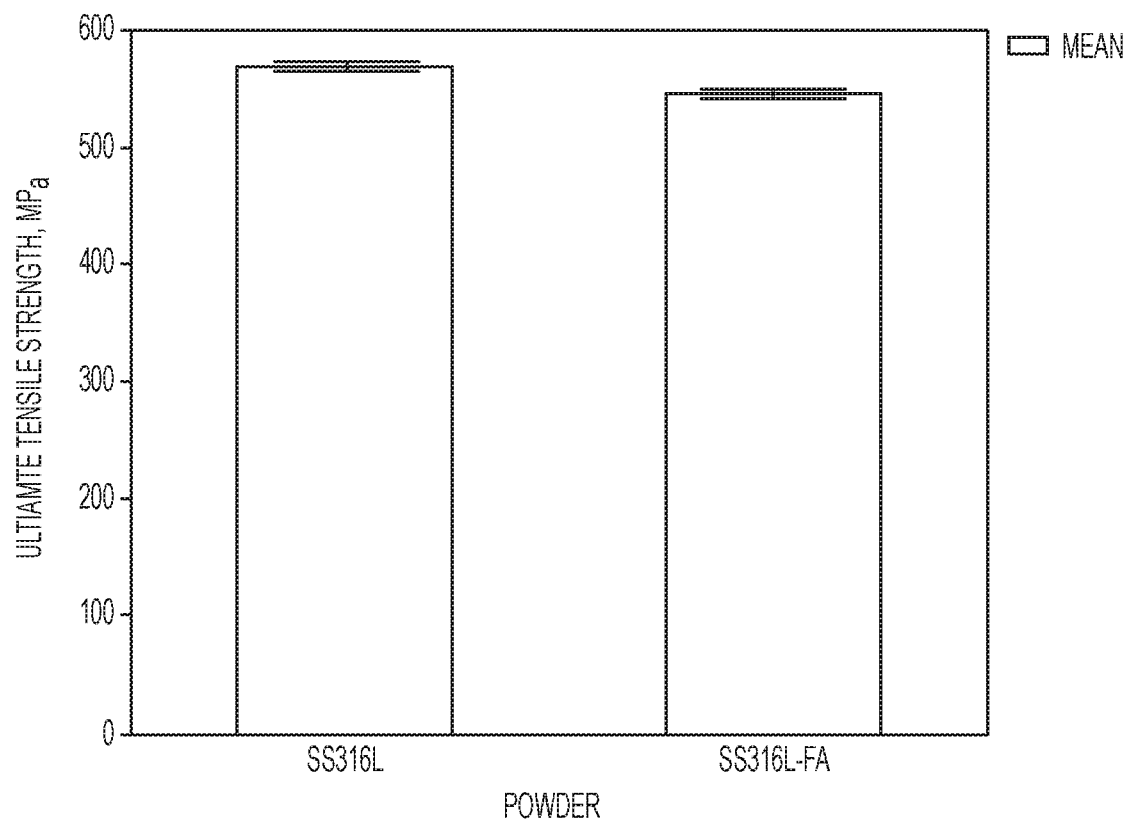
FIG. 9 is a column graph depicting the Ultimate Tensile Strength (UTS) test results for test specimens according to the present disclosure.

FIG. 9 is a column graph depicting the Ultimate Tensile Strength (UTS) test results for the SS316L and SS316L+FA test specimens. As shown in FIG. 9, the mean UTS for SS316L was about 569 MegaPascals (MPa); and the mean UTS for SS316L+FA was about 543 MPa. Thus, the mean UTS for the specimen with the flow additive was within 95% of the mean UTS for the control specimen with no flow additive. The error bars in FIG. 9 were constructed using 1 standard deviation from the mean.

Figure 10:
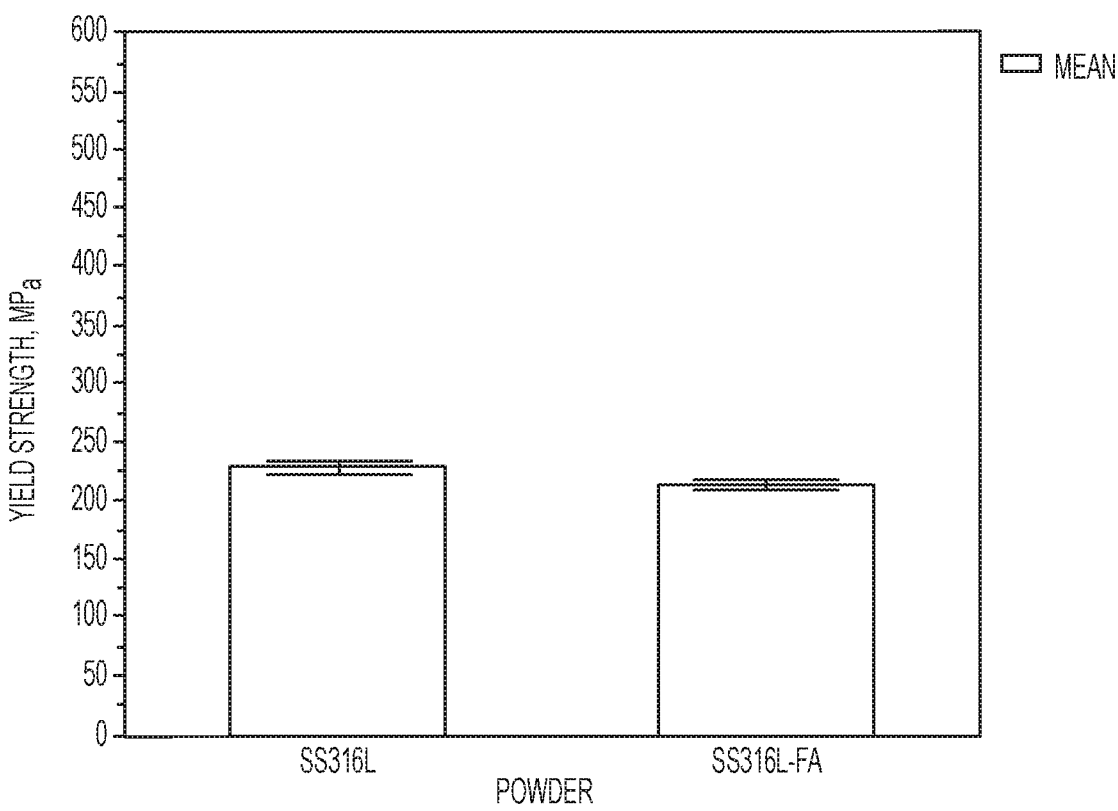
FIG. 10 is a column graph depicting the Yield Strength test results for test specimens according to the present disclosure.

FIG. 10 is a column graph depicting the Yield Strength test results for the SS316L and SS316L+FA test specimens. As shown in FIG. 10, the mean Yield Strength for SS316L was about 229 MegaPascals (MPa); and the mean Yield Strength for SS316L+FA was about 214 MPa. Thus, the mean Yield Strength for the specimen with the flow additive was within 93% of the mean Yield Strength for the control specimen with no flow additive. Similarly to the error bars in FIG. 9, the error bars in FIG. 10 were constructed using 1 standard deviation from the mean.

Figure 11:
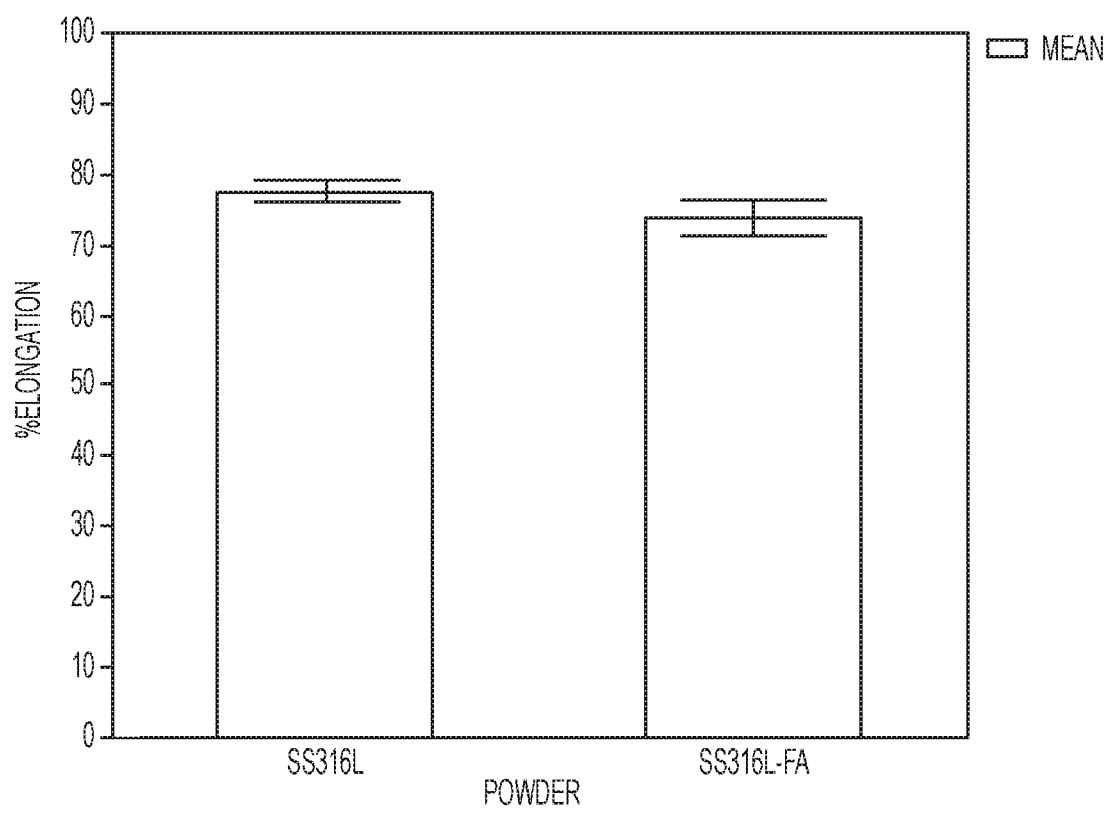
FIG. 11 is a column graph depicting the Percent Elongation test results for test specimens according to the present disclosure.

FIG. 11 is a column graph depicting the Percent Elongation test results for the SS316L and SS316L+FA test specimens. As shown in FIG. 11, the mean Percent Elongation for SS316L was about 78%; and the mean Percent Elongation for SS316L+FA was about 74%. Thus, the mean Percent Elongation for the specimen with the flow additive was within 94% of the mean Percent Elongation for the control specimen with no flow additive. Similarly to the error bars in FIG. 9 and FIG. 10, the error bars in FIG. 11 were constructed using 1 standard deviation from the mean.

These results indicate that the flow additive improves the flowability of the baseline build material composition, but does not deleteriously affect the mechanical strength of the part formed.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from 95.00 weight percent to about 99.99 weight percent should be interpreted to include the explicitly recited limits of 95.00 weight percent to about 99.99 weight percent, as well as individual values, such as 95.73 weight percent, 96 weight percent, 97.2 weight percent, etc., and sub-ranges, such as from about 95.25 weight percent to about 99.25 weight percent, from about 96 weight percent to about 98.75 weight percent, etc. Furthermore, when "about" is utilized to describe a value, this is meant to encompass minor variations (up to +/−10%) from the stated value. As used herein, the term "few" means about three.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A build material composition, comprising:
a host metal powder present in an amount ranging from about 95.00 weight percent to about 99.99 weight percent, based on a total weight of the composition, the host metal powder including host metal particles having an average particle size of less than 20 micrometers and the host metal powder having a sintering temperature of from about 500° C. to about 1800° C.; and
a flow additive present in an amount ranging from about 0.01 weight percent to about 5.00 weight percent, based on the total weight of the composition, wherein the flow additive consists of particles of a freeze-dried organic material that is pyrolyzable at a pyrolysis temperature that is less than the sintering temperature of the host metal powder,
wherein the particles of the freeze-dried organic material include a heteropolymer having a hydrophobic component that makes up from about 65% by weight to about 99.9% by weight of the heteropolymer and a hydrophilic component that makes up from about 0.1% by weight to about 35% by weight of the heteropolymer with the hydrophobic component having a lower glass transition temperature compared to the hydrophilic component, wherein:
the hydrophobic component is formed from a monomer selected from the group consisting of ethyl acrylate, ethyl methacrylate, propyl acrylate, propyl methacrylate, hydroxyethyl acrylate, octadecyl methacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, vinyl chloride, vinylidene chloride, N-vinyl imidazole, N-vinylcarbazole, N-vinyl-caprolactam, and combinations thereof; and
the hydrophilic component is formed from an acidic monomer selected from the group consisting of ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, and combinations thereof, and wherein the composition is spreadable, having a Hausner Ratio less than 1.25.

2. The build material composition as defined in claim 1 wherein the particles of the flow additive include primary particles having an average flow additive primary particle size ranging from about 1 to about 3 orders of magnitude smaller than the average particle size of the host metal particles.

3. The build material composition as defined in claim 2 wherein the average flow additive primary particle size ranges from about 5 nanometers to about 200 nanometers.

4. The build material composition as defined in claim 1 wherein the flow additive is a polymer having a glass transition temperature greater than about 5 degrees above a spread temperature of the composition, and wherein the spread temperature of the composition is from about 25° C. to about 200° C.

5. The build material composition as defined in claim 1 wherein the flow additive is hydrophobic.

6. The build material composition as defined in claim 1 wherein when the flow additive undergoes pyrolysis, the pyrolysis yields volatile decomposition products and non-volatile carbon-rich residue with the volatile decomposition products being at least about 90 percent of a pre-pyrolyzed weight of the flow additive.

7. The build material composition as defined in claim 1 wherein the particles of the freeze-dried organic material are a nano-powder produced by freeze drying an aqueous dispersion of polymer nano-particles.

8. The build material composition as defined in claim 7 wherein the aqueous dispersion of polymer nano-particles is produced by emulsion polymerization or co-polymerization of the monomer of the hydrophobic component and the acidic monomer of the hydrophilic component.

9. The build material composition as defined in claim 1 wherein the average particle size of the host metal particles is from about 11 micrometers to about 20 micrometers.

10. The build material composition as defined in claim 1 wherein the host metal particles are stainless steel particles and the average particle size is about 11 micrometers.

11. The build material composition as defined in claim 1 wherein the flow additive is not an adhesive.

12. The build material composition as defined in claim 1 wherein the hydrophobic component makes up about 65% by weight and the hydrophilic component makes up about 35% by weight of the heteropolymer of the freeze-dried organic material.

13. The build material composition as defined in claim 1 wherein the monomer of the hydrophobic component is selected from the group consisting of ethyl acrylate, propyl acrylate, propyl methacrylate, hydroxyethyl acrylate, tetrahydrofurfuryl acrylate, alkoxylated tetrahydrofurfuryl acrylate, 2-phenoxyethyl methacrylate, benzyl acrylate, ethoxylated nonyl phenol methacrylate, trimethyl cyclohexyl methacrylate, n-octyl methacrylate, tridecyl methacrylate, isodecyl acrylate, dimethyl maleate, dioctylvinyl imidazole, maleate, acetoacetoxyethyl methacrylate, diacetone acrylamide, vinylidene chloride, N-N-vinylcarbazole, N-vinyl-caprolactam, and combinations thereof.

14. A three-dimensional (3D) printing kit, comprising:
a build material composition, including:
a host metal powder present in an amount ranging from about 95.00 weight percent to about 99.99 weight percent, based on a total weight of the build material composition, the host metal powder including host metal particles having an average particle size of less than 20 micrometers and the host metal powder having a sintering temperature of from about 500° C. to about 1800° C.; and
a flow additive present in an amount ranging from about 0.01 weight percent to about 5.00 weight percent, based on the total weight of the build material composition, wherein the flow additive consists of particles of a freeze-dried organic material that is pyrolyzable at a pyrolysis temperature less than the sintering temperature of the host metal powder, and wherein the particles of the freeze-dried organic material include a heteropolymer having a hydrophobic component that makes up from about 65% by weight to about 99.9% by weight of the heteropolymer and a hydrophilic component that makes up from about 0.1 by weight to about 35% by weight of the heteropolymer with the hydrophobic component having a lower glass transition temperature compared to the hydrophilic component, wherein:
the hydrophobic component is formed from a monomer selected from the group consisting of ethyl acrylate, ethyl methacrylate, propyl acrylate, propyl methacrylate, hydroxyethyl acrylate, octadecyl methacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, vinyl chloride, vinylidene chloride, N-vinyl imidazole, N-vinylcarbazole, N-vinyl-caprolactam, and combinations thereof; and
the hydrophilic component is formed from an acidic monomer from the group consisting of ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, and combinations thereof, and
wherein the build material composition is spreadable, having a Hausner Ratio less than 1.25; and
a binder agent to be applied to at least a portion of a layer of the build material composition via an inkjet printhead to pattern a cross-section of an intermediate part.

15. A method for making a three-dimensional printing build material composition, comprising:
combining a host metal powder and a flow additive to form a build material mixture, the host metal powder being present in an amount ranging from about 95.00 weight percent to about 99.99 weight percent based on a total weight of the build material mixture and the flow additive being present in an amount ranging from about 0.01 weight percent to about 5.00 weight percent based on the total weight of the build material mixture, wherein the host metal powder has a sintering temperature of from about 500° C. to about 1800° C. and includes host metal particles having an average particle size of less than 20 micrometers, and the flow additive consists of particles of a freeze-dried organic material that is pyrolyzable at a pyrolysis temperature that is less than the sintering temperature of the host metal powder with the particles of the freeze-dried organic material including a heteropolymer having a hydrophobic component that makes up from about 65% by weight to about 99.9% by weight of the heteropolymer and a hydrophilic component that makes up from about 0.1% by weight to about 35% by weight of the heteropolymer with the hydrophobic component having a lower glass transition temperature compared to the hydrophilic component, wherein:
the hydrophobic component is formed from a monomer selected from the group consisting of ethyl acrylate, ethyl methacrylate, propyl acrylate, propyl methacrylate, hydroxyethyl acrylate, octadecyl methacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, vinyl chloride, vinylidene chloride, N-vinyl imidazole, N-vinylcarbazole, N-vinyl-caprolactam, and combinations thereof; and the hydrophilic component is formed from an acidic monomer selected from the group consisting of ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, and combinations thereof; and mixing the build material mixture until a build material composition having a Hausner Ratio less than 1.25 is formed.

* * * * *